US012304238B2

(12) United States Patent
Branca et al.

(10) Patent No.: US 12,304,238 B2
(45) Date of Patent: May 20, 2025

(54) HUB-BEARING UNIT FOR A WHEEL OF A MOTOR VEHICLE

(71) Applicant: AKTIEBOLAGET SKF, Gotenborg (SE)

(72) Inventors: Giancarlo Branca, Rivoli (IT); Marco Romanetto, Pianezza (IT)

(73) Assignee: AKTIEBOLAGET SKF (SE)

( * ) Notice: Subject to any disclaimer, the term of this patent is extended or adjusted under 35 U.S.C. 154(b) by 45 days.

(21) Appl. No.: 18/296,439

(22) Filed: Apr. 6, 2023

(65) Prior Publication Data

US 2023/0331040 A1 Oct. 19, 2023

(30) Foreign Application Priority Data

Apr. 13, 2022 (IT) .................. 102022000007313

(51) Int. Cl.
*B60B 27/00* (2006.01)
(52) U.S. Cl.
CPC ...... *B60B 27/0042* (2013.01); *B60B 27/0005* (2013.01); *B60B 27/0036* (2013.01); *B60B 27/0078* (2013.01); *B60B 27/0094* (2013.01)
(58) Field of Classification Search
CPC .... F16C 19/186; F16C 19/386; F16C 35/063; F16C 35/073; F16C 2326/02; B60B 27/00; B60B 27/005; B60B 27/0078; B60B 27/0094; B60B 27/02; B60B 27/026; B60B 35/127; B60B 35/128; B60B 35/14; B60B 35/18; B60B 27/0005; B60B 27/0021; B60B 27/0026; B60B 27/0031; B60B 27/0036; B60B 27/0042
See application file for complete search history.

(56) References Cited

U.S. PATENT DOCUMENTS 6,170,628 B1 * 1/2001 Bigley ............... B60K 17/3515
301/105.1
8,047,724 B2 * 11/2011 Kamikawa ............ B60B 27/001
301/105.1
(Continued)

FOREIGN PATENT DOCUMENTS

EP 3150873 4/2017

OTHER PUBLICATIONS

International Search Report for corresponding Italy Patent Application No. 102022000007313 dated Nov. 28, 2022.

*Primary Examiner* — Alan B Waits
(74) *Attorney, Agent, or Firm* — Reed Smith LLP

(57) ABSTRACT

A hub-bearing unit with an axis of rotation includes a stationary, radially external ring, a radially internal flanged hub, rotatable about the axis and including a first shoulder, a second shoulder, a first relief groove, and a section (SR) radially opposite the first relief groove. At least one row of rolling bodies is interposed between the external ring and the flanged hub. The hub-bearing unit includes a first radial ball bearing and a second radial ball bearing interposed between a stem of a constant velocity joint and the flanged hub and opposite the first shoulder and the second shoulder. The second ball bearing mounts inside a seat of the flanged hub and a spacer axially abuts the second shoulder and mounts inside the seat between the second shoulder and the second ball bearing. The seat includes a second relief groove formed in an axially external position relative to section (SR).

11 Claims, 3 Drawing Sheets

(56) References Cited

U.S. PATENT DOCUMENTS

| | | | |
|---|---|---|---|
| 8,267,593 B2* | 9/2012 | Suma | B60B 27/0084 384/903 |
| 11,535,098 B2* | 12/2022 | Badino | F16C 19/548 |
| 2007/0217728 A1* | 9/2007 | Kashiwagi | B60B 27/001 384/589 |
| 2008/0258539 A1* | 10/2008 | Schumacher | B60B 27/0084 301/105.1 |
| 2008/0258541 A1* | 10/2008 | Kamikawa | B60B 27/001 301/131 |
| 2014/0103702 A1 | 4/2014 | Komori | |
| 2021/0170788 A1 | 6/2021 | Falossi | |
| 2022/0324320 A1* | 10/2022 | Badino | B60B 27/0036 |

* cited by examiner

HUB-BEARING UNIT FOR A WHEEL OF A MOTOR VEHICLE

CROSS-REFERENCE TO RELATED APPLICATIONS

This application is based on and claims priority to Italian Patent Application No. 102022000007313 filed on Apr. 13, 2022, under 35 U.S.C. § 119, the disclosure of which is incorporated by reference herein.

FIELD

The present invention relates to a hub-bearing unit for a wheel of a motor vehicle.

BACKGROUND

Hub-bearing units include a bearing unit disengageably coupled to a constant velocity joint suitable for use both on a driving wheel and on a driven wheel of a motor vehicle. The bearing unit rotatably supports the wheel of the motor vehicle on a suspension, while the constant velocity joint is mechanically connected to a drive shaft of the motor vehicle.

BRIEF DESCRIPTION OF THE DRAWINGS

The disclosure will now be described with reference to the attached drawings which illustrate non-limiting example of embodiments thereof, in which.

DETAILED DESCRIPTION

Figure 1:
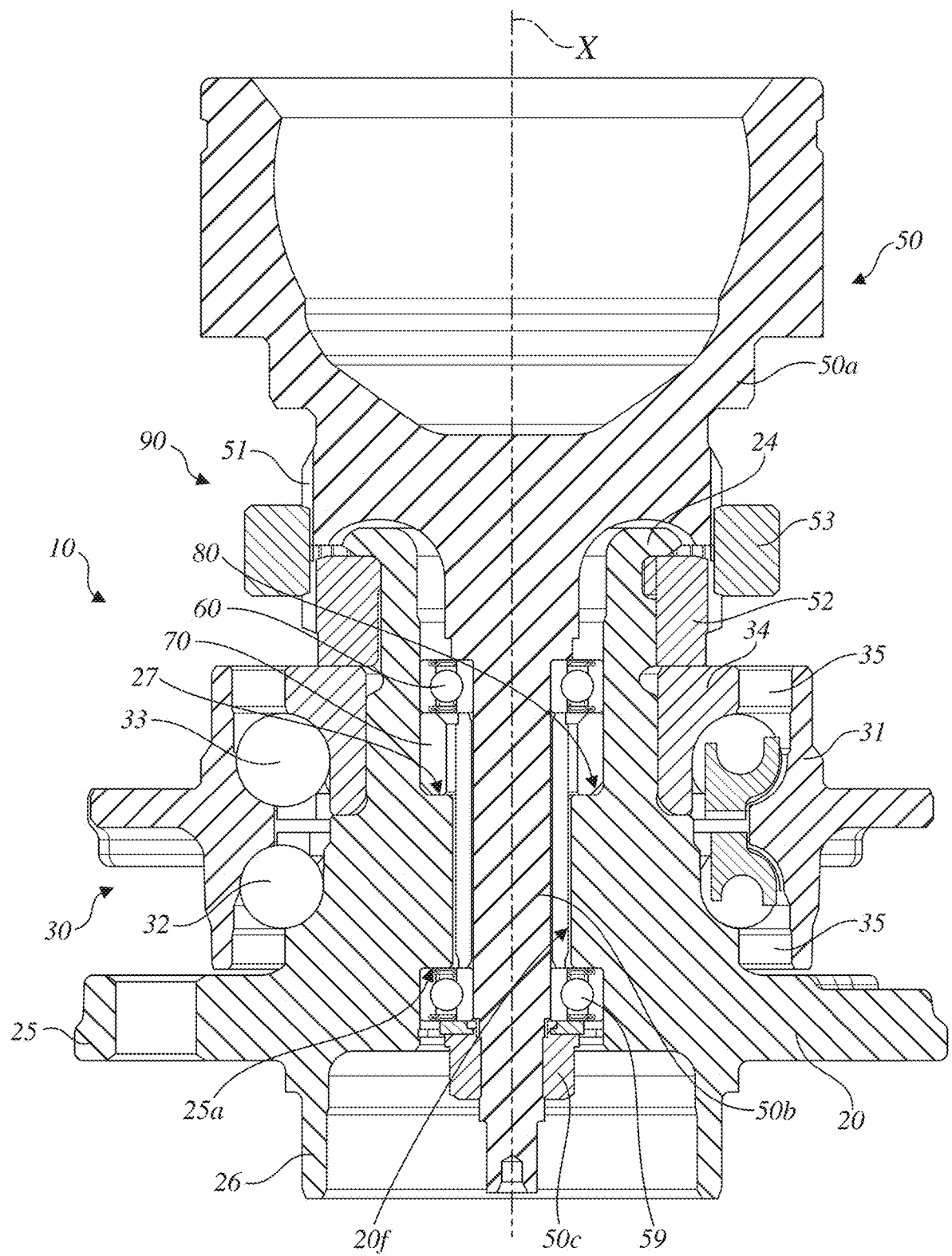
FIG. 1 is a cross-sectional view of a hub-bearing unit for a system for disconnection from a drive shaft.

Hub-bearing units provided with a bearing unit for rotatably supporting a wheel of a vehicle on a suspension system is known and commonly used. The bearing unit, in general, may include, but is not limited to, a pair of rolling bearings.

Known hub-bearing units may include a rotatable flanged hub mechanically connected to a rotating element of a motor vehicle, for example a wheel or a disc of a braking element. Known hub-bearing units may also include a bearing unit that includes an outer ring, a pair of inner rings, one of which may be the flanged hub itself, and a plurality of rolling bodies, e.g., balls. All these components may have an axial symmetry with respect to an axis of rotation of the rotating elements, such as the flanged hub and the inner rings of the bearing unit.

The flanged hub may receive driving torque from a bell of a constant velocity joint via a grooved joint. In particular, the bell of the constant velocity joint may be provided with external axial teeth, while a ring with external axial teeth may be fixed onto the flanged hub. A toothed rim with internal axial teeth may transmit movement from the constant velocity joint to a wheel hub, and the toothed rim may be provided with a system that may disconnect the toothed rim from the toothed ring of the flanged hub. Therefore, when the toothed rim engages with the toothed ring of the flanged hub, transmission of movement occurs from a drive shaft to the wheel of the vehicle, which therefore behaves in the manner of a driving wheel. Vice versa, when the toothed rim disengages from the toothed ring of the hub, transmission of movement from the drive shaft to the wheel is interrupted, and the wheel behaves in the manner of a driven wheel.

Additional bearings may be implemented between the flanged hub and the constant velocity joint so that the flanged hub may rotate independently of the constant velocity joint. These additional bearings may be, but are not limited to, radial ball bearings.

Therefore, a hub-bearing unit with a system that may disconnect the hub-bearing unit from the drive shaft may require an internally hollow flanged hub and two or more radial ball bearings in a radially internal position with respect to the flanged hub. Furthermore an axially internal radial ball bearing may require an axial shoulder in order to define an axial position of the constant velocity joint with respect to the hub-bearing unit.

In order to machine a seat in which a radial ball bearing sits, a relief groove may be included in a vicinity of the axial shoulder.

This requirement, together with the form and the position of the relief groove formed directly in the flanged hub, as well as the narrow section of the flanged hub where the relief groove may be formed (the narrow section arises from the need for the machining of a toothed profile for engagement between the flanged hub and toothed ring), result in a high degree of stressing precisely in the region of the relief groove and a low fatigue wear of the flanged hub.

It is therefore necessary to define a new design solution for hub-bearing units that overcome the aforementioned drawbacks and reduce wear on the hub-bearing unit.

An object of the present disclosure is to provide a hub-bearing unit with a system for disconnection from the drive shaft and a flanged hub provided with a radially internal spacer serving as an axial shoulder for a radial ball bearing. The use of a spacer for providing an axial shoulder of the radial ball bearing allows a different internal form of the flanged hub to be obtained. In fact, the relief groove for machining of the flanged hub may be formed in an axially external position with respect to the spacer and therefore in a zone of the flanged hub that is less stressed and in any case is situated sufficiently far from a narrow—and therefore most critical—section of the flanged hub. It will also be possible to have a greater degree of design freedom and therefore provide a longer groove with larger radii in order to reduce concentration of tension.

By way of a non-limiting example, the present disclosure will now be described with reference to a hub-bearing unit for motor vehicles which is provided with a bearing unit.

With reference to FIG. 1, a hub-bearing unit 10 may be interposed, during use, between a wheel and a chassis (both of a known type and not shown for simplicity of illustration) of a vehicle, and may be selectively coupled to a constant velocity joint 50 by means of a known transmission device 90 for purposes of transmission or interruption of driving torque to a respective wheel (not shown).

In some embodiments, the hub-bearing unit may include a rotatable flanged hub 20 and a bearing unit 30 having a central axis of rotation X. Bearing unit 30 may include a radially external, stationary ring 31, a flanged hub 20 defining a radially internal, rotating ring 34, and two rows of rolling bodies 32 and 33 interposed between external ring 31 and internal ring 34. By way of non-limiting example, rolling bodies 32 and 33 may be balls, needle rollers, or any other suitable rolling body. In other embodiments, internal ring 34 may be stationary and external ring 31 may be rotatable. Hub-bearing unit 10 may further include one or more sealing devices 35 to seal bearing unit 30 from an external environment.

In some embodiments, constant velocity joint 50 may include a bell 50a provided with a plurality of radially external axial teeth 51 arranged in a vicinity of flanged hub 20, and a stem 50b integral with bell 50a and mounted via flanged hub 20 so as to be axially locked by means of a threaded ring nut 50c.

In the whole of the present description and in the claims, the terms and the expressions indicating positions and orientations such as "radial" and "axial" are understood as referring to a central axis of rotation X of the bearing unit 30. Expressions such as "axially external" and "axially internal", instead, refer to the assembled condition of the hub-bearing assembly and, in the case in question, preferably are in relation to a wheel side and a side opposite to the wheel side, respectively.

For the sake of simpler graphical illustration, reference numbers 32 and 33 may be attributed both to the rows of rolling bodies and the individual rolling bodies that make up the rows.

In some embodiments, flanged hub 20 may include a central through-hole 20f that extends along axis X and may be engaged by stem 50b. Flanged hub 20 may further include on an axially external side thereof, a flange 25 on an axially external side of flanged hub 20 used to fix hub-bearing unit 10 to a vehicle wheel. Flanged hub 20 may still further include a rolled edge 24 on an axially internal side of flanged hub 20 that may pre-stress, in an axially external direction, both inner ring 34 and a toothed ring 52. Toothed ring 52 may be mounted against inner ring 34 and, together with teeth 51, form part of transmission device 90.

In some embodiments, flanged hub 20 may include an axially external cylindrical portion 26 that may act to center the vehicle wheel (not illustrated).

In some embodiments, transmission device 90 may selectively transmit a driving torque supplied by a drive shaft (known and not shown) that is angularly joined together with constant velocity joint 50. The transmission device 90 may include a toothed rim 53 with a plurality of internal axial teeth that may be selectively engaged with teeth 51 such that hub-bearing unit 10 is idle. Additionally, toothed rim 53 may engage with teeth 51 and toothed ring 52 to angularly lock bell 50a together with flanged hub 20. Therefore, when toothed rim 53 of transmission device 90 engages with toothed ring 52 of flanged hub 20, transmission of movement occurs from the drive shaft to the wheel of the vehicle, which thus behaves as a driving wheel. And when toothed rim 53 disengages from toothed ring 52, the transmission of movement from the drive shaft to the wheel may be interrupted, and the drive shaft behaves as an idle wheel.

Figure 2:
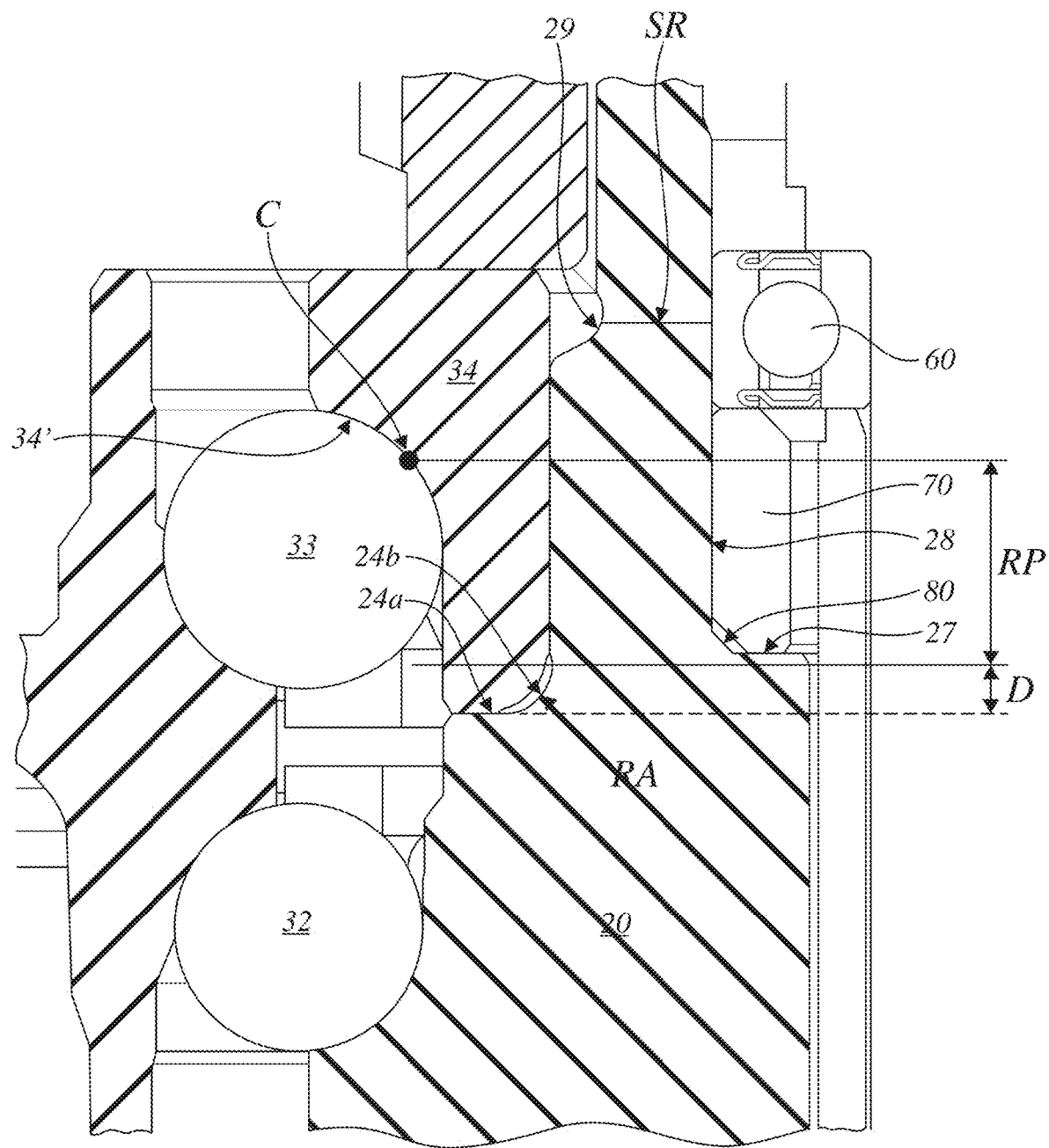
FIG. 2 is a detail, on a larger scale, of the hub-bearing unit of FIG. 1.

With reference also to FIG. 2, in a "disengaged" configuration where flanged hub 20 is disengaged from bell 50a of the constant velocity joint 50, bearings between flanged hub 20 and stem 50b of constant velocity joint 50 may be present to allow flanged hub 20 to rotate independent of constant velocity joint 50.

In some embodiments, flanged hub 20 may include a first shoulder 25a and a second shoulder 27, which both may be positioned radially internal and may be formed inside central through-hole 20f. First shoulder 25a may be positioned axially adjacent to a first ball bearing 59, and second shoulder 27 may be positioned axially adjacent to a second ball bearing 60. Radial ball bearings 59 and 60 may be mounted in a radially internal position with respect to flanged hub 20 and radially external position with respect to stem 50b of constant velocity joint 50. In particular, first radial ball bearing 59 may be mounted in an axially external position against first shoulder 25a and second radial ball bearing 60 is mounted in an axially internal position, i.e., towards bell 50a of the constant velocity joint 50, against second shoulder 27.

In some embodiments, an axial stop for second radial ball bearing 60 may be realized by a spacer 70, which may be positioned radially internal with respect to the flanged hub 20 and axially external with respect to radial ball bearing 60. In turn, spacer 70 may be axially locked against second axial shoulder 27 of flanged hub 20. Spacer 70 may help define an axial position of constant velocity joint with respect to hub-bearing unit 20.

In some embodiments, ring nut 50c may clamp tightly first radial ball bearing 59 against first shoulder 25a and exert axial compressive forces on flanged hub 20 via an outer ring of first ball bearing 59. Ring nut 50c may also clamp tightly second radial bearing 60 and spacer 70 against second shoulder 27 and exert compressive forces on flanged hub 20 via an outer ring of second ball bearing 60. As a result of the stresses transmitted from the vehicle wheel, these axial compressive forces may generate reaction forces against first shoulder 25a and second shoulder 27. In some embodiments, these reaction forces may be greater at second shoulder 27 than at axial shoulder 25a because axial shoulder 27 is axially internal and located at a part of flanged hub 20 with a radial section SR having a smaller radial thickness relative to a radial section of flanged hub 20 located at first shoulder 25a.

In some embodiments, radial section SR may be located opposite a radially external relief groove 29 of flanged hub 20, which may be used for machining a toothed profile for engagement between flanged hub 20 and toothed ring 52.

In some embodiments, flanged hub 20 may include a radially internal seat 28 that houses second radial ball bearing 60 and spacer 70. In order to be able to carry out grinding operations on radially internal seat 28, a relief groove 80 may be defined between seat 28 and second axial shoulder 27 of flanged hub 20. Relief groove 80 may therefore be defined in an axially external position with respect to seat 28 and in an axially internal position with respect to flanged hub 20. Since SR is in a zone of flanged hub 20 that is subject to high flexing loads, high tensions are produced that adversely affect the working life of flanged hub 20. Due to the presence of spacer 70, relief groove 80 may be formed sufficiently far from radial section SR of flanged hub 20, which is also a critical point in terms of tension applied to flanged hub 20 due to the reduced thickness of flanged hub 20 at SR relative to surrounding portions of flanged hub 20. By introducing spacer 70, relief groove 80 may be formed with a greater degree of design freedom, for example with a sufficiently large radius R, but in particular will not result in a concentration of tension forces in a vicinity of section SR of the flanged hub 20.

Therefore introducing spacer 70 allows internal relief groove to be formed in different positions and with greater variety in form as compared to known hub-bearing units that do not use a spacer.

Introduction of a spacer, e.g., spacer 70, solves various critical problems of a structural nature. For example, without a spacer, radially internal relief groove 80 would be positioned opposite first radial ball bearing 59 and therefore in a position axially "facing" radially external relief groove 29. Moreover, because radially internal relief groove 29 is formed opposite first radial ball bearing 59, radially internal relief groove 80 would have a form determined by the geometry of first radial ball bearing 59. For example, radially internal relief groove 80 would have a limited axial length and radius (such as an axial length of the order of 2 mm and a radius of the order of 0.8 mm). The consequence of this hub-bearing unit is a very narrow section SR of flanged hub 20, as well as a notch effect due to the presence of the radially internal relief groove, both of which increase the risk of breakage during use and decrease the working life of flanged hub 20 and the viable operating conditions of flanged hub 20.

Thus, by introducing spacer 70, radially internal relief groove 80 may be formed further from radially external relief groove and section SR of flanged hub 20 in a more axially external position that a hub bearing unit without spacer 70. This allows relief groove 80 to be defined by larger radius and include a greater overall length, both of which contribute to a reduction of the notch effect and improve the working life of flanged hub 20.

In some embodiments, a second axially internal ball bearing (not shown) may be arranged alongside first radial ball bearing without modifying the dimensions of flanged hub 20, and simply reducing an axial length of spacer 70. Presence of a second axially internal ball bearing may be desirable where a single axially internal ball bearing is insufficient to withstand the stresses caused by constant velocity joint 50.

Figure 3:
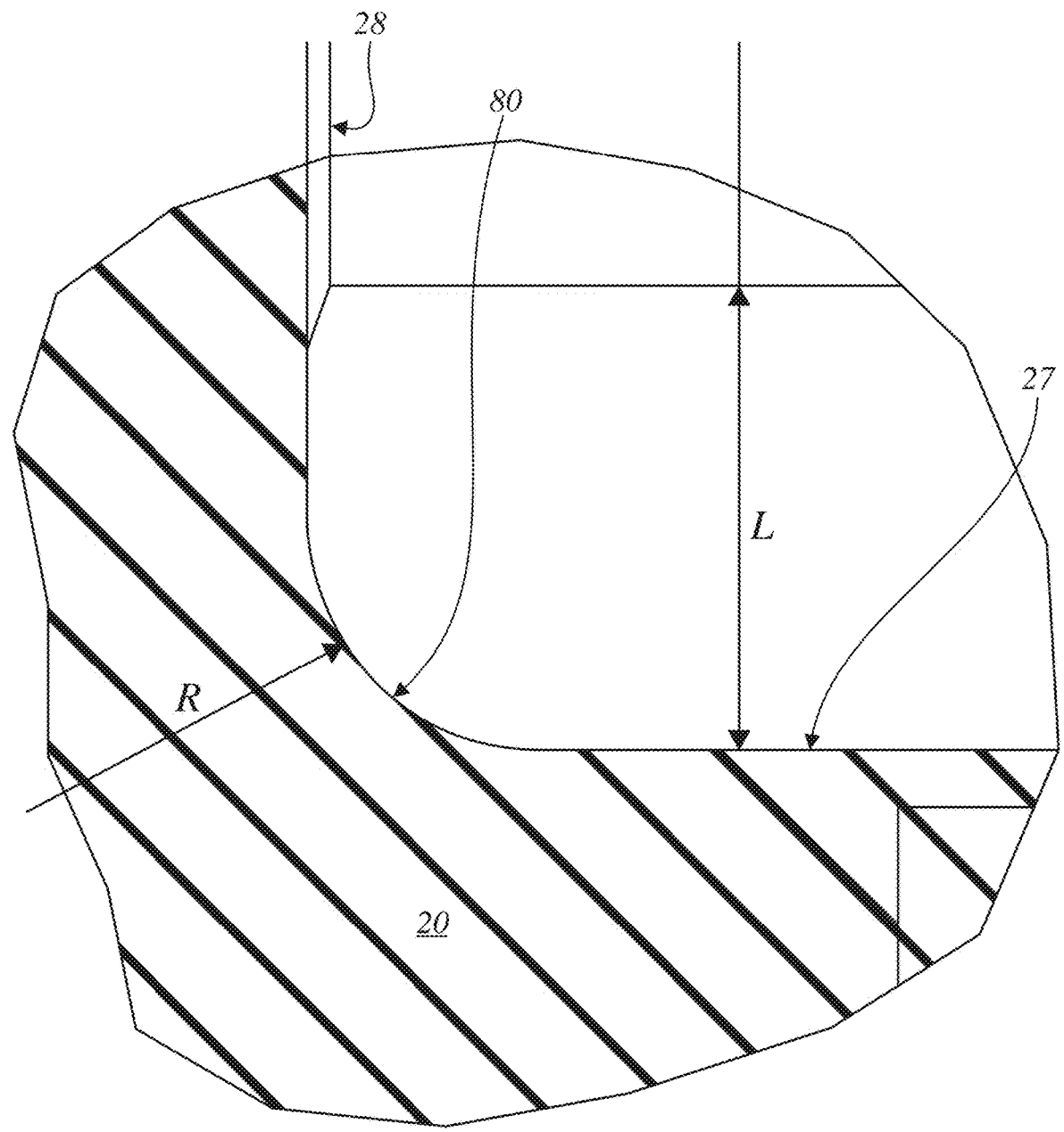
FIG. 3 is a detail, on a further enlarged scale, of a radially internal relief groove of a flanged hub of the hub-bearing unit of FIG. 1.

With reference also to FIGS. 2 and 3, particular exemplary geometric parameters for optimizing relief groove 80 and eliminating structural problems of flanged hub 20 will now be described. In some embodiments, relief groove 80 may include a radius R between 1.8 mm and 2.2 mm and an axial length L between 3.8 mm and 4.2 mm.

Relief groove 80 may be positioned such that an axially internal boundary of relief groove 80 (i.e., an axially internal limit position of relief groove 80) may coincide with a projection of a center C onto axis X. Center C may be a center pressure between rolling bodies 33 and raceway 34' of radially inner ring 34, since forces from external loads may be transmitted in a vicinity of Center C.

In various embodiments, an axially external boundary of relief groove 80 (i.e., an axially external limit position of relief groove 80) may be defined at a distance D from surface 24a, which may be where radially inner ring 34 abuts flanged hub 20, in an axially internal direction. In some embodiments, distance D may be between 2.4 mm and 2.6 mm. In this way, alignment of relief groove 80 with surface 24a and with an adjacent fillet 24b of flanged hub 20 may be avoided, preventing an increase in tension in a region of a radius RA of fillet 24b.

Therefore, in some embodiments, an axial position of relief groove 80 may be within a section RP defined by an axially internal boundary of relief and an axially external boundary as discussed above and illustrated in FIG. 2.

Hub-bearing units consistent with this disclosure solve a critical structural problem that negatively affects the working life of the hub-bearing unit, as discussed above. Furthermore, due to reduced mechanical stresses imparted on a hub bearing unit in accordance with this disclosure, it may possible to use the same hub bearing unit for similar applications, but require management of higher loads. An advantage of a hub bearing unit according to the present disclosure is that a zone of the relief groove, e.g., relief groove 80, may not require local heat treatment. Finally, a hub bearing unit in accordance with this disclosure offers design flexibility because, by modifying a length of a spacer, e.g., spacer 70, as many as two axially internal radial ball bearings, e.g., ball bearings 59 and 60, may be inserted without modifying the design of the flanged hub, e.g., flanged hub 20. Consequently, a decision about the use of one or two axially internal ball bearings (in addition, obviously, to the axially external radial ball bearing) may be taken at any stage during development, without making design modifications to the flanged hub.

In addition to the embodiment of a hub bearing unit described in the present disclosure, it must be understood that there exist numerous other variants. It must also be understood that these embodiments are only examples and limit neither the scope of the disclosure, nor its applications, nor its possible configurations. On the contrary, although the description above allows the person skilled in the art to implement the present disclosure at least according to one of its exemplary embodiments, it must be understood that many variants of the components described are possible, without thereby departing from the scope of the disclosure, as defined in the accompanying claims, interpreted literally and/or in accordance with their legal equivalents.

We claim:
1. A hub-bearing unit with an axis of rotation (X), comprising:
    a stationary, radially external ring;
    a radially internal flanged hub, rotatable about axis (X) and comprising:
        a radially internal first shoulder;
        a radially internal second shoulder; and
        a radially external first relief groove;
        a section (SR) radially opposite the first relief groove,
            wherein the flanged hub is configured to axially engage a stem of a constant velocity joint;
    at least one row of rolling bodies interposed between the radially external ring and the radially internal flanged hub;
    at least one radial ball bearing, wherein the at least one radial ball bearing comprises:
        a first radial ball bearing; and
        a second radial ball bearing interposed between the stem of the constant velocity joint and the flanged hub and opposite the first shoulder and the second shoulder;
        wherein the second radial ball bearing mounts inside a seat of the flanged hub in an axially internal position relative to the first radial ball bearing, the seat delimited axially by the second shoulder of the flanged hub;
    a spacer mounted inside the seat of the flanged hub axially between the second axial shoulder and the second radial ball bearing, wherein the spacer axially abuts the second shoulder,
    wherein the seat comprises a second relief groove formed in an axially external position relative to the section (SR) of the flanged hub.

2. The hub-bearing unit of claim 1, wherein a radius of the second relief groove comprises between 1.8 mm and 2.2 mm.

3. The hub-bearing unit of claim 1, wherein an axial length of the second relief groove comprises between 3.8 mm and 4.2 mm.

4. The hub-bearing unit of claim 1, wherein an axially internal boundary of the second relief groove coincides radially with a center (C) of pressure between the rolling bodies of the at least one row of rolling bodies and a raceway of a radially internal ring interposed on a radially internal side of the radially internal flanged hub.

5. The hub-bearing unit of claim 4, wherein an axially external boundary of the second relief groove and a axially external surface of abutment of the radially internal ring and the flanged hub are separated axially by a distance (D) comprising between 2.4 mm and 2.6 mm.

6. The hub bearing unit of claim 5, wherein the flanged hub further comprises a fillet adjacent to the axially external surface of abutment of the radially internal ring and the flanged hub.

7. The hub-bearing unit of claim 1, further comprising:
a ring nut configured to clamp the second radial ball bearing and the spacer against the second shoulder of the flanged hub.

8. The hub-bearing of claim 1, wherein the first shoulder is radially adjacent to the first radial ball bearing, the second shoulder is radially adjacent to the second radial ball bearing, the first radial ball bearing is axially external and the second radial ball bearing is axially internal relative to the first radial ball bearing.

9. The hub-bearing unit of claim 8, further comprising:
a ring nut configured to clamp the second radial ball bearing and the spacer against the second shoulder of the flanged hub and configured to clamp the first radial ball bearing against the first shoulder of the flanged hub.

10. The hub-bearing unit of claim 9, further comprising a toothed ring mounted against the radially inner ring and configured to engage a toothed rim of a transmission device.

11. A hub-bearing unit with an axis of rotation (X) and comprising:
a stationary, radially external ring;
a radially internal flanged hub, rotatable about axis (X) and comprising:
a radially internal first shoulder;
a radially internal second shoulder; and
a radially external first relief groove;
a section (SR) radially opposite the first relief groove, wherein the flanged hub is configured to axially engage a stem of a constant velocity joint;
at least one row of rolling bodies interposed between the radially external ring and the radially internal flanged hub;
a radially inner ring interposed on an axially internal side of the radially internal flanged hub;
at least one radial ball bearing, wherein the at least one radial ball bearing comprises:
a first radial ball bearing;
a second radial ball bearing interposed between the stem of the constant velocity joint and the flanged hub and opposite the first shoulder and the second shoulder,
wherein the second radial ball bearing mounts inside a seat of the flanged hub in an axially internal position relative to the first radial ball bearing, the seat delimited axially by the second shoulder of the flanged hub;
a spacer mounted inside the seat of the flanged hub axially between the second axial shoulder and the second radial ball bearing, wherein the spacer axially abuts the second shoulder; and
a ring nut configured to clamp the second radial ball bearing and the spacer against the second shoulder of the flanged hub,
wherein the seat comprises a second relief groove formed in an axially external position relative to the section (SR) of the flanged hub,
wherein a radius of the second relief groove comprises between 1.8 mm and 2.2 mm,
wherein an axial length of the second relief groove comprises between 3.8 mm and 4.2 mm,
wherein an axially internal boundary of the second relief groove coincides radially with a center (C) of pressure between the rolling bodies of the at least one row of rolling bodies and a raceway of the radially internal ring,
wherein the first shoulder is radially adjacent to the first radial ball bearing, the second shoulder is radially adjacent to the second radial ball bearing, the first radial ball bearing is axially external and the second radial ball bearing is axially internal relative to the first radial ball bearing.

* * * * *